(12) United States Patent
Sinclair

(10) Patent No.: US 8,215,079 B2
(45) Date of Patent: Jul. 10, 2012

(54) BUILDING BLOCK AND SYSTEM FOR MANUFACTURE

(75) Inventor: Robert F. Sinclair, Treasure Island, FL (US)

(73) Assignee: Encore Building Solutions, Inc, St. Louis, MO (US)

( * ) Notice: Subject to any disclaimer, the term of this patent is extended or adjusted under 35 U.S.C. 154(b) by 248 days.

(21) Appl. No.: 12/583,875

(22) Filed: Aug. 27, 2009

(65) Prior Publication Data

US 2010/0064623 A1  Mar. 18, 2010

Related U.S. Application Data

(63) Continuation-in-part of application No. 11/811,757, filed on Jun. 12, 2007, now abandoned, which is a continuation-in-part of application No. 11/238,934, filed on Sep. 29, 2005, now abandoned, which is a continuation-in-part of application No. 10/411,551, filed on Apr. 10, 2003, now abandoned.

(60) Provisional application No. 60/371,441, filed on Apr. 11, 2002.

(51) Int. Cl.
*E04C 2/04* (2006.01)
(52) U.S. Cl. ............... 52/596; 52/DIG. 9; 52/309.17
(58) Field of Classification Search ............... 52/DIG. 9, 52/309.12, 309.17, 596; 264/241; 524/8
See application file for complete search history.

(56) References Cited

U.S. PATENT DOCUMENTS

| | | | |
|---|---|---|---|
| 513,423 A | 1/1894 | Schmall | |
| 1,608,562 A | 11/1926 | Melandri | |
| 2,319,345 A | 5/1943 | Putnam | |
| 2,527,766 A | 10/1950 | Rule | |
| 2,815,293 A | 12/1957 | Randall | |
| 3,336,122 A | 8/1967 | Smith | |
| 3,355,849 A | 12/1967 | Hancock | |
| 3,625,723 A | 12/1971 | Sicka | |
| 3,753,749 A | 8/1973 | Nutt | |
| 3,830,776 A | 8/1974 | Carlson et al. | |
| 3,847,634 A * | 11/1974 | Vickery | 106/784 |
| 3,869,295 A | 3/1975 | Bowles et al. | |
| 3,936,989 A | 2/1976 | Hancock | |
| 3,948,830 A | 4/1976 | Donnelly et al. | |
| 3,956,534 A | 5/1976 | Brown et al. | |
| 3,980,490 A * | 9/1976 | Schneider | 106/287.17 |
| 3,982,954 A | 9/1976 | Jeskey | |
| 4,011,092 A * | 3/1977 | Yue | 106/705 |
| 4,126,979 A | 11/1978 | Hancock | |
| 4,130,458 A * | 12/1978 | Moore et al. | 162/159 |
| 4,132,555 A | 1/1979 | Barrable | |
| 4,268,316 A * | 5/1981 | Wills, Jr. | 106/707 |
| 4,339,405 A | 7/1982 | Paszner | |
| 4,374,672 A | 2/1983 | Funston et al. | |

(Continued)

*Primary Examiner* — Robert Canfield
*Assistant Examiner* — Brent W Herring
(74) *Attorney, Agent, or Firm* — Paul M. Denk

(57) ABSTRACT

A compressed building block formed of a pre-mix of fly ash, Class C type, are combined with various aggregates either ground wood and/or chips, having maybe a small amount of Portland cement added thereto, moisturized, and then either molded, extruded or compressed in a press into the configuration of a block. A plasticizer, wetting agent and surfactant solution may be added to the composition. Boron as a mold retardant and an insecticide, may be added to the composition, to provide the formed block with further beneficial attributes. The blocks may be formed by a system for extruding such blocks from the formulation, or they may be formed by means of a mold or hydraulic or other press and pressed into the configuration of the desired block, needed for the construction.

7 Claims, 5 Drawing Sheets

U.S. PATENT DOCUMENTS

| | | | |
|---|---|---|---|
| 4,406,703 A * | 9/1983 | Guthrie et al. | 106/731 |
| 4,407,677 A | 10/1983 | Wills | |
| 4,514,949 A | 5/1985 | Crespo | |
| 4,518,431 A | 5/1985 | Duvier | |
| 4,659,385 A | 4/1987 | Costopoulos et al. | |
| 4,799,961 A * | 1/1989 | Friberg | 106/720 |
| 4,840,672 A | 6/1989 | Baes | |
| 4,985,119 A | 1/1991 | Vinson et al. | |
| 5,030,289 A * | 7/1991 | Sattler et al. | 106/805 |
| 5,048,250 A | 9/1991 | Elias | |
| 5,102,596 A | 4/1992 | Lempfer et al. | |
| 5,154,771 A * | 10/1992 | Wada et al. | 106/730 |
| 5,282,700 A | 2/1994 | Rodrique | |
| 5,350,451 A | 9/1994 | Patterson | |
| 5,352,288 A | 10/1994 | Mallow | |
| 5,366,548 A | 11/1994 | Riddle | |
| 5,387,738 A | 2/1995 | Beckman et al. | |
| 5,405,211 A | 4/1995 | Halwani | |
| 5,405,441 A * | 4/1995 | Riddle | 106/705 |
| 5,472,499 A | 12/1995 | Crocker | |
| 5,488,806 A | 2/1996 | Melnick et al. | |
| 5,496,384 A | 3/1996 | Jeskey et al. | |
| 5,534,058 A * | 7/1996 | Strabala | 106/708 |
| 5,580,378 A | 12/1996 | Shulman | |
| 5,622,556 A | 4/1997 | Shulman | |
| 5,643,359 A * | 7/1997 | Soroushian et al. | 106/805 |
| 5,664,382 A | 9/1997 | Melnick et al. | |
| 5,715,635 A | 2/1998 | Sherwood | |
| 5,729,943 A | 3/1998 | Cambiuzzi | |
| 5,759,260 A | 6/1998 | Groh | |
| 5,785,419 A | 7/1998 | McKelvey | |
| 5,822,939 A | 10/1998 | Haener | |
| 5,858,032 A | 1/1999 | Hardy et al. | |
| 5,858,083 A * | 1/1999 | Stav et al. | 106/735 |
| 5,916,104 A | 6/1999 | Lucen et al. | |
| 5,916,362 A * | 6/1999 | Takahara et al. | 106/767 |
| 5,984,589 A | 11/1999 | Ciccarello | |
| 6,001,169 A | 12/1999 | Kawai | |
| 6,030,447 A | 2/2000 | Naji et al. | |
| 6,065,265 A | 5/2000 | Stenekes | |
| 6,082,067 A | 7/2000 | Bott | |
| 6,083,318 A | 7/2000 | Zawada et al. | |
| 6,153,674 A | 11/2000 | Landin | |
| 6,298,632 B1 | 10/2001 | Sherwood | |
| 6,397,549 B1 | 6/2002 | Baldwin | |
| 6,454,850 B2 | 9/2002 | Yamashita et al. | |
| 6,485,561 B1 | 11/2002 | Dattel | |
| 6,506,248 B1 * | 1/2003 | Duselis et al. | 106/713 |
| 6,539,682 B1 | 4/2003 | Ryder | |
| 6,613,109 B2 | 9/2003 | Chandaria | |
| 6,645,290 B1 | 11/2003 | Barbour | |
| 6,656,858 B1 | 12/2003 | Cahill | |
| 6,669,773 B2 | 12/2003 | Malloy et al. | |
| 6,716,293 B2 | 4/2004 | Taymourian et al. | |
| 6,761,765 B2 | 7/2004 | Lu | |
| 6,827,527 B2 | 12/2004 | Conkel et al. | |
| 6,839,639 B2 | 1/2005 | Bache | |
| 6,843,844 B1 | 1/2005 | Van Horn | |
| 6,941,720 B2 * | 9/2005 | DeFord et al. | 52/783.14 |
| 6,994,815 B1 | 2/2006 | Durack | |
| 7,033,430 B2 | 4/2006 | Mills | |
| 7,097,706 B2 | 8/2006 | Choi et al. | |
| 7,294,193 B2 | 11/2007 | Comrie | |
| 2002/0021042 A1 * | 2/2002 | Damron | 299/12 |
| 2003/0047119 A1 | 3/2003 | Hemmings et al. | |

* cited by examiner

BUILDING BLOCK AND SYSTEM FOR MANUFACTURE

CROSS-REFERENCE TO RELATED APPLICATIONS

This application is a continuation-in-part of the application having Ser. No. 11/811,757, filed on Jun. 12, 2007 now abandoned, which is a continuation-in-part of application having Ser. No. 11/238,934, which was filed on Sep. 29, 2005 now abandoned, which is a continuation-in-part application of the non-provisional patent application having Ser. No. 10/411,551, now abandoned, filed on Apr. 10, 2003, based upon provisional patent application having Ser. No. 60/371,441, filed on Apr. 11, 2002, which is owned by the same inventors.

BACKGROUND OF THE INVENTION

This invention relates principally to a building block, one that is constructed, generally of waste material, such as fly ash, and can be either extruded or compressed under pressure into the fabrication of a building block for use for constructing buildings or the like.

There are numerous building blocks that are available in the art for use for the construction primarily of commercial and industrial type of buildings, and even some of such blocks are used for constructing residential homes, as known. For example, most of these blocks are fabricated from concrete, poured into a form, left to cure, and then removed, and allowed to dry, in preparation for usage. Blocks of this type, generally of a concrete type block, can be constructed to a variety of shapes.

Various prior art types of blocks, usually of the molded type, can be seen in the prior patent to Haener, U.S. Pat. No. 5,822,939, identified as An Insulated Building Block System. The patent to Putnam, U.S. Pat. No. 2,319,345, discloses another type of Fabricated Building Block. The patent to Crespo, U.S. Pat. No. 4,514,949, shows an Interlocking System for Building Walls, and it should particularly be noted that the shown block includes openings, and through which reinforcing rods may locate, during building fabrication. The patent to Schmall, U.S. Pat. No. 513,423, discloses another form of Building Block. The patent to Sherwood, U.S. Pat. No. 5,715,635, discloses a Building Block Unit and Method of Manufacturing the Same. This includes an interlocking type of feature that can hold the blocks together, even perhaps without connecting mortar. The patent to Stenekes, U.S. Pat. No. 6,065,265, shows A Corner and End Block for Interlocking Building Blocks System.

The patent to Hancock, U.S. Pat. No. 3,355,849, shows a Building Wall and Tapered Interfitting Blocks Therefore. Another patent to Hancock, U.S. Pat. No. 3,936,989, shows an Interlocking Building Type of Block That Can Be Fabricated into a Wall System, even perhaps with or without the use of mortar. U.S. Pat. No. 4,126,979, to Hancock, shows another Interlocking Form of Building Block.

The current invention is designed to provide for the construction of a building block, by a variety of methods, but one which utilizes extensively what are currently considered as waste products, with Class-C fly ash the primary ingredient and other fibrous materials, in the category of wood chips, textile waste, rice hulls, straw, sugar cane, sugar beet, sugar waste lime, and other fibrous material, or other such solids, not pulverized, to add bulk and strength to the mixture For example, the United States patent to Strabala, U.S. Pat. No. 5,534,058, discloses a structural product fabricated from waste materials, and its method of making the same. The product includes as ingredients fly ash, cellulose-based material, and an adhesive binder for holding these ingredients together. The patent states that the composition is particularly useful for forming structural products such as bricks, panels, roof shingles, studs, and the like. More specifically, the patent defines that the structural product, which may also be formed into blocks, comprises a substantially homogeneous blend from seventy to eighty five percent (70 to 85%) by weight of a Class C fly ash, or a mixture of Class C fly ash and Class F fly ash. The mixture further includes about fifteen to thirty percent (15 to 30%) by weight of a cellulose based material, which can be pulp, wood, sawdust, pulverized cardboard, or the like. The block further includes an adhesive binder, which is categorized as an adhesive bindery emulsion, even one which can be mixed with water to form a liquid, but preferably the adhesive binder is defined as polyvinyl acetate, which can be added to the composition as a polyvinyl acetate emulsion. To quote Dr. Robert Sickler's definition of an adhesive, "adhesives use surface attachments to bind two solids together, and it does not form a new matrix through the identified reaction." In other words, there is no reaction in the Strabala process or product. The composition also includes an inner filler, and such material may include lime, Class F fly ash, or bottom ash, up to about thirty five percent (35%) by weight of the total weight of the composition, but the original matrix is maintained. No reaction.

The current invention likewise utilizes a fly ash as a primary ingredient, but varies substantially from what is identified in the Strabala patent, utilizing either a molding or pressure application to form its composite blocks, for use for a related purpose, and that is for building purposes.

Other prior art patents identifying the use of fly ash, as an ingredient for forming insulating and ceramic materials, and the like, include the United States patent to Sicka, U.S. Pat. No. 3,625,723, for Foamed Ceramic Comprising Fly Ash and Phosphoric Acid. U.S. Pat. No. 1,608,562, to Melandri, defines the Manufacture of Building Blocks, Slabs, Floors, Ceilings, Tiles, and the Like, from a mixture of fibers and cementitious material, and hydrated lime. The patent to Halwani, U.S. Pat. No. 5,504,211, describes a Lightweight Block Containing Stabilized Wood Aggregates. The patent to Riddle, U.S. Pat. No. 5,366,548, explains the use of Volcanic Fly Ash and Kiln Dust Compositions, and a Process for Making Articles Therefrom. The patent to Patterson, U.S. Pat. No. 5,350,451, explains a Building Material Made from Waste Paper and a Method for Producing the Same. The patent to Wada, et al., U.S. Pat. No. 5,154,771, explains a Hydraulic Inorganic Composition and Molded Articles Thereof. The patent to Lempfer, et al., U.S. Pat. No. 5,102,596, explains the Method of Producing Shaped Articles of Fiber/Binder Mixtures. The patent to Elias, U.S. Pat. No. 5,048,250, shows another type of Building Block. The patent to Vinson, et al., U.S. Pat. No. 4,985,119, shows a Cellulose Fiber-Reinforced Structure. The patent to Baes, U.S. Pat. No. 4,840,672, explains that Lightweight Insulating Boards and Process for Manufacturing the Same. The patent to Costopoulos, et al., U.S. Pat. No. 4,659,385, shows a Building Material Manufacturing from Fly Ash. The patent to Barrable, U.S. Pat. No. 4,132,555, explains a Building Board. Finally, the patent to Nutt, U.S. Pat. No. 3,753,749, shows other Concrete Compositions.

SUMMARY OF THE INVENTION

This invention relates primarily to the construction of a unique building block, one fabricated totally from waste materials, and a number of systems by which the block may be fabricated and molded, into a high strength, lightweight finished product.

Essentially, the concept of this invention is to utilize a fly ash, specifically of the class C type, and which may or may not include elements of slag, or silica fume, all of which include the ingredient calcium hydroxide, CH, which when mixed with silica, in the presence of water, initiates a pozzolanic reaction and activity, wherein the calcium hydroxide is said to have what are identified as pozzolans that contain a morphecilica which is sufficient when reacted with silica in the presence of water to combine with the calcium hydroxide to form a calcium silicate hydrate, C—S—H, combination. This is particularly true when the pozzolan is combined with cement, such as Portland cement, and during hydration, causes this pozzolanic reaction that binds the materials together into the highly cementitious C—S—H composition. The final product is a completely new reacted matrix. This reaction holds the materials together into a highly cementitious C—S—H composition. This is the basis for formation of this unique building block when the formulation is exposed to moderate pressure.

As is well known, the only source for this Calcium Hydroxide is from the Class C fly ash or Portland cement, as known. It mixes with the silicates, in the presence of water, it does form a chemical reaction that combines into the formula C—S—H.

It is also been found that utilizing high compression upon these types of ingredients works negatively on the hardening process as the blocks are formed. Thus, the only pressure that is utilized in this development is a lower pressure, and just enough to cause the slurry to form and conform to the die pattern.

Once the fifty percent (50%) to ninety percent (90%) fly ash is in the mixture, it does not really matter what aggregate is added to the composition, but in the Preferred Embodiment it is the fibrous material, and some small aggregate, not pulverized, that provides best formation of the blocks and to allow the water, when mixed, to achieve that pozzolanic reaction. It changes the Calcium Hydroxide into the highly cementitious calcium silica hydroxide, which does get hard on its own.

The aggregates can be defined as fibrous, or solids. The fibrous material is a ground fibrous material, not pulverized and which may be wood chips, textile waste, bamboo, sugar cane, beet sugar residue, rice hulls, straw, and related types of fibrous materials. When formed into the blocks, they function as hard wood, and in that condition, can accept screws, nails, can be sawed, drilled, and even cut with a router.

Other solids like sugar beet waste lime, sea shells, sand, gravel, etc., while they do not accept screws or nails, do function to provide hardness to the block when formed. These aggregates, unless they contain some silicates, do not enhance the chemical pozzolanic reaction of the block hardening, but they do add strength to the block.

Other tests have indicated that blocks formed in the manner of this invention can resist radiation, and a test has indicated that when exposed to radiation, only about fifteen percent (15%), at the maximum, of the radiation photons can penetrate through these formed blocks. Hence, these types of blocks may have value as an insulation at medical installations, where radiation is frequently utilized.

This invention contemplates three aspects relating to its concept, initially, the formulation and type of building block constructed, and three methods or system by which the block may be fabricated, in preparation for usage.

Essentially, the building block of this invention can be fabricated of the open cavity type, but preferably, is constructed into the configuration of a solid block, thereby providing it with greater strength and less acceptable to fracture, because of the solid integrated nature of its construction. Because of the type of waste materials from which the block is fabricated as to be sequentially described, and which may include some elements of wood pulp, or the like, the block will accept and hold a nail, screw, or the like, so that supplemental sheeting, whether exteriorly or interiorly, can be applied and held directly to it, during fabrication of a building. Furthermore, because of the inherent nature of its ingredients, it can also be subject to cutting by a power saw, or the like. In addition, the block of this invention, because of its composition, has enhanced thermal resistant characteristics, as can be understood. In addition, it can be treated, with other ingredients, such as a borate, to render it mold free and provide excellent termite resistance. It can function as a sound insulation; even can be used as a party wall in condominiums, hotels or near high-noise areas, like at airports, or industrial parks, to provide that type of insulation; Rating 52.

Significantly, the block of this invention has high strength, has a large load bearing capacity, due to its solid configuration, and obviously provides safety during usage, can lower energy bills, as previously alluded to, but at the same time, is fabricated from generally waste ingredients, meaning that it will be low cost in construction. The block is made generally of about ninety nine percent (99%) waste materials, and therefore, is earth-friendly, as can be understood.

In the preferred embodiment, the block may be constructed having dimensions generally in the category of eight inches high, eight inches deep, and sixteen inches wide (8"×8"×16"). Obviously, other dimensions can be readily applied during fabrication of the blocks of this invention.

Generally, the formula for the compressed molded or low pressure extruded or compressed blocks of this invention are designed to provide maximum usage of waste material, such as fly ash, as known in the art. For example, where it is desired to fabricate a block having dimensions generally within the range of eight inches by eight inches, and to any length (8"×8"×any length), depending upon the mold, are the cut-off point for the extruded type of block, it will include a Class C Fly ash in a range of about fifty percent (50%) to ninety percent (90%) by weight of the formulated block. Ground wood or other small sized unpulverized aggregate as previously described, may be applied in the vicinity of ten percent (10%) to thirty percent (30%) by weight of the mixed formulation. Portland cement may be added in a range of about ten to twenty percent (10% to 20%), for additional pozzolanic purposes because Portland cement contains a significant higher percentage of calcium hydroxide. Finally, optionally, boron, or zinc boride, may be added in the range of one half percent to five percent (½% to −5%) by weight of the mixed formulation, in order to furnish the mold protection, and as a preventer of insect infestation, characteristics which are desirable particularly since the formulation of this invention includes ground wood ingredients, as previously explained. Class C fly ash is readily available in abundance from the many coal fired electric generating plants.

In addition, it needs to be emphasized that fly ash is generated primarily through the processing of coal, and when coal burns it provides an ash that generally produces a class C fly ash and to some extent a class F fly ash.

In addition, other ingredients that may be used as aggregate in lieu of ground wood. Effectively textile waste, rice hulls, ground bamboo, straw, sea shells, sand, river sand, quarry sand, and desert sand, all of which may be used, to add further strength to the composition, from anywhere between thirteen percent (13%) to twenty five percent (25%) by weight, thereby reducing the amount of fly ash that may be necessary in the composition, or for reducing the wood pulp ingredient, in order to provide enhanced strength to the blocks, when formed, as can be understood. This is because these types of aggregate matter, particularly textile waste, bamboo, straw, or the like, all have a fibrous consistency which has a tendency to bind the mixture together when moisture and a plasticizer is added to the composition, before its molding into the block form. Obviously, the greater the quantity of sand or other glandular material that is added to the block, reducing the wood pulp content, makes the block less isolative, and reduces the ability of the finished block to accept and hold the nail and screw, when applied during the fabrication of a building.

The system of fabricating the blocks of this invention include the extruding method, which incorporates a cyclone wood chip hopper, into which the chips may be included, and in which hopper the fly ash from an outside silo may be delivered, to provide for the proper mixing. A variable speed feeder may be used to deliver the mixture to a pre-mixer, wherein treated water may be added, and a displacement compressor provides the necessary pressure on the mixture, as it is delivered to a variable speed extruder, that may extrude a continuous block, to whatever cross sectional dimensions desired, such as eight inches by eight inches (8"×8"), but to any length before it may be cut off. Such lengths may even be as great as four feet to sixteen feet long (4' to 16'), for the extruded block, exiting from the operations of the extruder. The block may then be conveyed to another location for drying, curing, and storage, before it is shipped to the building site, for usage.

The preparation of the compressed block may be achieved through the usage of a hydraulic press, which exerts a ram force upon the block ingredients, of the low pressures as described, delivered to the site of pressing, where the blocks are instantly formed under low pressure, into individual blocks, to dimensions as desired, and then exit the compression chamber by way of a conveyer, to a remote location for further drying and curing, or for storage until usage. The type of modified hydraulic press, that has been modified, and found useful for the purposes of building the blocks of this invention, may be obtained from Encore Building Solutions, Inc., of St. Louis, Mo.

Essentially, what is believed to occur when the composition of Class C fly ash is mixed with treated water and waste material, a pozzolanic reaction takes place, which essentially causes a new matrix in the formulation, from its ingredients, and how the ingredients are held together, into the formed block. The treated water will include the plasticizer that acts as wetting agent to accelerate the occurrence of the pozzolanic reaction. Furthermore, other ingredients, in the category of an accelerator or retarder, may be added to the composition, to either speed up the reaction particularly during performance of the block forming process at colder temperatures, or for slowing down the reaction during hot temperatures. These ingredients will be subsequently described. All of these identified materials, as explained, produce this pozzolanic reaction that is a combination of minerals and mixtures that mainly consist of fly ash, slag, and cilica fume. These materials are all able to react with calcium hydroxide contained in the Class C fly ash or Portland cement, and is said to have that pozzolanic activity between the cellulose or granular material, the fly ash, and the water, in addition to whatever Portland cement may be added to the composition, for higher pozzolan levels. A plasticizer, such as PLP accelerator Quantec PL-488" or a retarder from W. R. Grace & Co., of Cambridge, Mass., or from General Resource Tec., of Eagan, Minn., a plasticizer melchem accelerator, Polychem Soper Set or retardant Polychem R or from Sika Corp., from Marion, Ohio, a plasticizer Visco, accelerator rapid 1 retarder plastment or from Master Builders, of Cleveland, Ohio composition. That may be added in a range of ¼ oz., to 30 oz., by hundred weight of the fly ash in the mixed formulation. They function as a wetting agent.

It is, therefore, the principal object of this invention is to provide a unique building block that can be instantly fabricated for immediate usage at low cost from generally waste ingredients and materials.

Another object of this invention is to provide a molded, even one constructed under low pressure, of a building block to a variety of custom dimensions, at the selection of the builder, and the owner.

Still another object of this invention is to provide a medium weight fabricated building block.

Yet another object of this invention is to provide a building block that has retention attributes, and can hold a nail, or screw, upon application.

Still another object of this invention is to provide a building block that may be fabricated having various grooves, in order to allow the locating of reinforcing bars, utility conduits, or the like.

Still another object of this invention is to provide a building block having solid surface, and not necessarily made of the cavity type prior art block, and therefore exhibits a much larger load-bearing capacity than other type of fabricated blocks.

Still another object of this invention is to provide a treated building block that has high fire resistant rating.

Another object of this invention provides a building block that will be mold resistant, insect and termite resistant since the fly ash is a major ingredient, plus any organic inhibitors or coatings provide high specification in resisting insect infestation.

Yet another object of this invention is to provide a building block that resists water penetration;

Still another object of this invention is to provide a building block having a high wood content.

Another object is to provide a building block that incorporates means to act as a fire retardant so as to minimize damage when a fire occurs. Another object is to provide a building block in which fire retardancy ingredients may be included so as to minimize damage when a fire occurs. Generally, ASTM-E 119 requires a four hour load bearing test with a five minute hose stream, to sustain a wall structure when being sprayed for fire when burning.

Another object of this invention is to provide a building block that may be held together by thin set mastic, and does not necessarily require the usage of any mortar as normally accommodated and required between blocks in typical applications.

Another object of this invention is to provide a building block that exhibits thermal insulation value in the range of 20.5, and higher ASTM-E 1363

Still another object of this invention provides a building block that has excellent noise suppression benefits. 52-rating ASTM-E 90.

Yet another object of this invention is to provide a building block that eliminates the need for the stud-wall framing, and insulation batting. This can be achieved, because it already has good thermal insulation, and its wood content allows the builders to nail or screw the exterior and interior sheeting and other framing members, directly to the fabricated wall.

Another object of this invention, is to make a dry-stack wall system where Earthblocks™, blocks with their tongue and groove, top, bottom and both ends design allowing the blocks to be screwed together, not martered.

Another object of this invention is to provide a building block for use for fabricating walls, which in certain jurisdictions, are already approved for general building usage.

A composition of the blocks formed in the manner as described may be used to replace or eliminate stud walls, block walls, adobe walls, and the like, in usage.

Another advantage of this particular invention is that walls made from these blocks will result in far lower heating and cooling bills.

Still another object of this invention is that blocks made in accordance with this invention are formed of non-hazardous waste materials, thereby protecting the environment, and reducing the need for lumber, and other materials that are energy intensive and expensive in their acquisition.

To reiterate, another primary object of this invention is to provide a sustainable building product, being composed primarily of waste materials. Hence, it provides a method by which waste material may be disposed of and utilized, without filling the landfills, with such waste material.

These and other objects may become more apparent to those skilled in the art upon review of the summary of the invention as provided herein, and upon undertaking a study of the description of its preferred embodiment, in view of the drawings.

DESCRIPTION OF THE PREFERRED EMBODIMENT

Figure 1:
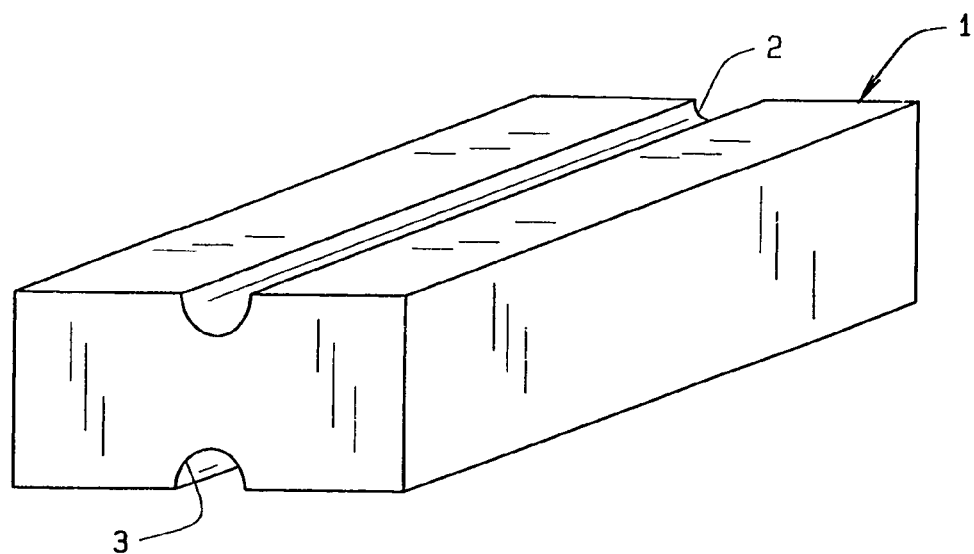
FIG. 1 provides an isometric view of the fabricated building block of this invention.
Figure 3:
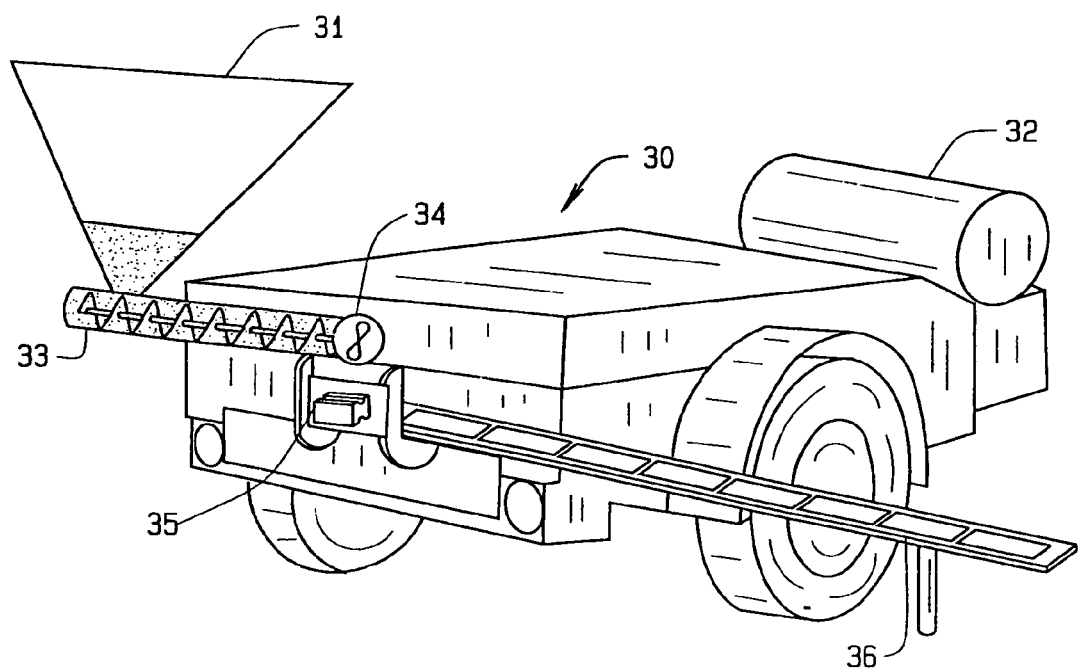
FIG. 3 is a schematic view of the hydraulic press utilized for the compression forming of the blocks as shown in FIG. 1 of this invention.

In referring to the drawings, and in particular FIG. 1, is an example of the way that the blocks can be fabricated by the system of this invention as readily disclosed. The building block 1 will be of standard shape or appearance, but can be fabricated to any size, but generally may be in the range of four inches high, eight inches wide, and twelve inches in length (4"×8"×12"). Obviously, other dimensions may be used for the block of this invention, and depending upon which system is used to fabricate the blocks, the dimensions are typically 9½"×8"×17½". The extruded block, a block of any length, even up to many feet in length, such as sixteen (16') as previously stated, could be developed. Or, where the block is molded by hydraulic pressure, it may have dimensions similar to those as shown in FIG. 1. In addition, the block may be molded or extruded having supplemental configurations, such as the upper and lower grooves 2 and 3, in addition to the tongue and grooves 5-8, as noted. The purpose of these grooves are to provide clearance, either for the locating of reinforcing bars, or perhaps to locate conduits, that may extend through the wall, and through which electrical wires, or provide for heat conveyance, or other types of utilities may be located.

Figure 4:
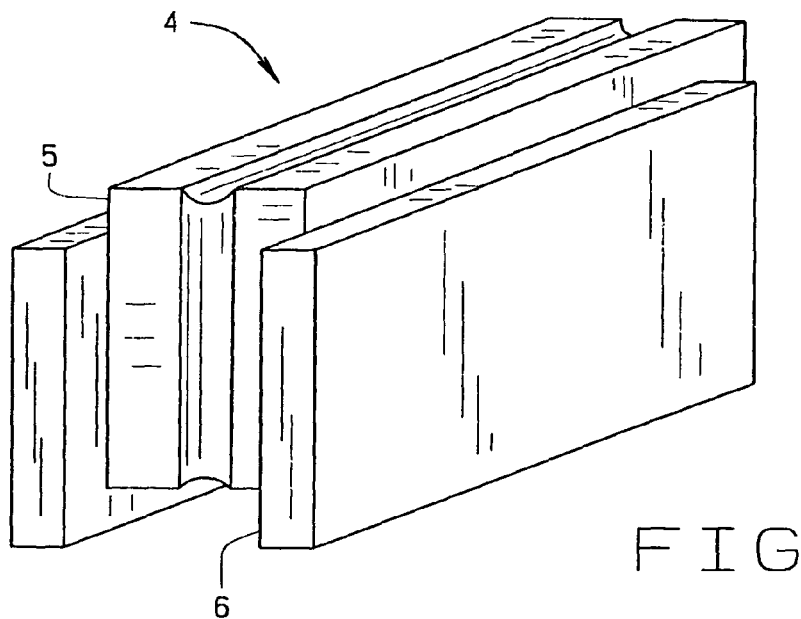
FIG. 4 is an isometric view of one of the blocks, having interengaging components, of this invention.
Figure 5:
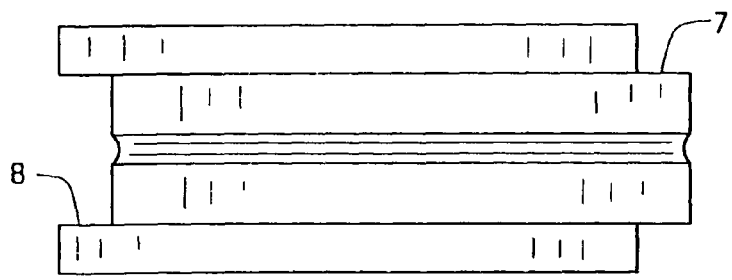
FIG. 5 is a top plan view of the block.
Figure 6:
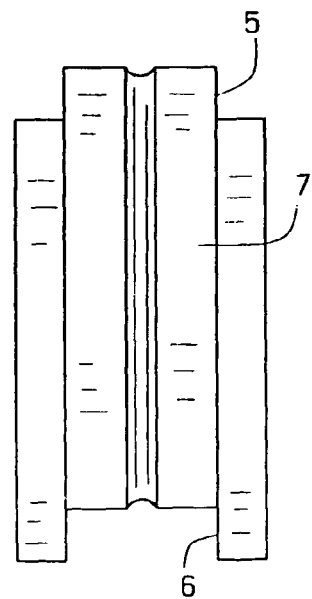
FIG. 6 is an end view of the block of FIG. 4.

As can be further seen in FIGS. 4-6, the preferred block of this invention not only is fabricated from the mixture of ingredients as summarized herein, but in addition, contains various contours that facilitate their application together in forming a wall, or the like. As can be seen, the block 4 is generally of the same dimensions as the one previously described, but in this example, included an integral extension 5, on the top, a recess 6 in the bottom, and an extension 7 and a recess 8, along either ends, so that when the blocks are laid together, they may interlock, to provide greater structural strength in holding the wall together, and minimize the need for mortar or other mix. This adds to the structural ability of the blocks to be integrated together, in forming walls. Thus, both the vertical and horizontal extensions, or tongue, and the recess or grooves, at both the top, bottom and ends, provides an intermating of the blocks together, as they are formed into a wall, and can be screwed together.

The formulation for the block of this invention can be seen from the tables hereinafter provided.

TABLE I

Molded, extruded, or compressed blocks all use the same mixtures.
Class C fly ash from about 50% to 90%
Boron from about 1% to about 5%
Ground wood from about 10% to about 50% or, other aggregates such as sugar beet, waste lime, textile waste, sugar cane, bamboo, rice hulls, and straw, in same proportions as above.
Note, any fibrous material will work as long as Class C fly ash is the main ingredient.
Treated water is applied to all these different admixtures, from approximately 10% to approximately 30%, by weight.

TABLE II

Portland cement from about 5% to 30%
Class C fly ash from about 55% 50 80%
Boron from about 1% to 5%
Ground wood from about 10% to 50% or other aggregates, such as ground textile waste, sugar cane, bamboo, rice hulls, straw, or any other strong fibrous material. Treated water is applied to these different mixtures, from approximately 10% to approximately 30%, by weight. This block has military applications

TABLE III

Extruded industrial blocks 8" × 8" × any length
Class C fly ash from 50% to about 65%
Ground wood from 35% to 50%
Portland cement from ½% to about 5%
Boron from ½% to about 5%
Treated Water sprayed up to from 20% to 30%

TABLE IV

Compressed industrial blocks 8" × 8" × any length
Class C fly ash from 25% to 32½%
Portland cement kiln dust 25% to about 32½%

TABLE IV-continued

Ground wood from 35% to about 65%
Portland cement from ½% to about 5%
Boron from ½% to about 5%, or

TABLE V

Compressed industrial blocks 8" × 8" × any length
Portland cement kiln dust from 50% to about 65%
Ground wood from 35% to about 65%
Portland cement from ½% to about 5%
Boron from ½% to about 5%

TABLE VI

Vegetation waste blocks 8" × 8" × any length
Sugar beet waste lime from 35% to about 65%
In addition to containing one or more of the ingredients
Listed in Tables I-V

TABLE VII

Vegetation waste blocks 8" × 8" × any length
Sea shell, sand, river sand, quarry sand, or desert sand from 35% to about 65%
In addition to containing one or more of the ingredients
Listed in Tables I-V

TABLE VIII

Vegetation waste blocks 8" × 8" × any length
Sugar beet waste lime from 35% to about 65%
In addition to containing one or more of the ingredients
Listed in Tables I-V It should be recognized herein that the treated water in the amount of ten percent (10%) to approximately thirty percent (30%) is applied to the mixture in forming the various blocks, as identified in the Tables herein, will include an additional ingredient of a plasticizer, such as that described in this application as available under the brand name PLP, from W. R. Grace & Co., in order to act as a wetting agent that accelerates the full wetting of the mixture materials, whether they be the fibrous material or the aggregates, to achieve complete moisturization of the ingredients before they are molded into the block form. It is also at this time that one of the accelerators or retarders may be included, in order to facilitate the mixing process, when the ambient temperatures may be in the significantly cold, or heat ranges, wherever this process is utilized.

Figure 7:
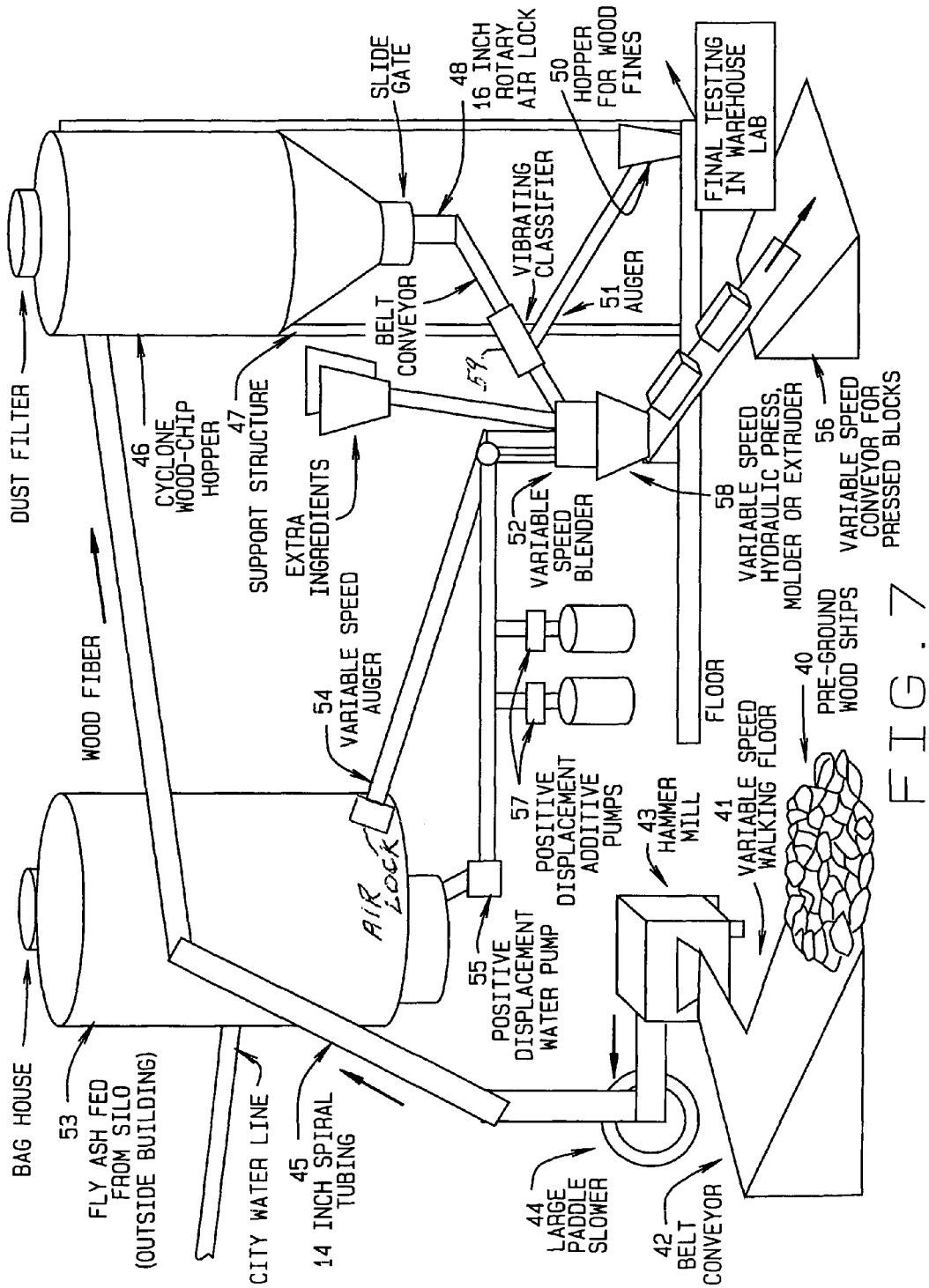
FIG. 7 is a schematic view of the preferred plant for fabrication of the formed blocks from the mixture of ingredients as defined for this invention.

As can be seen from FIG. 7, the system for extruding, molding, or, compressing the industrial building blocks of this invention is readily disclosed. As noted, the ingredients for the block are processed by the system, as disclosed. For example, pre-ground wood chips, as at 40, are delivered via a variable speed walking floor 41, to a conveyor 42, to a hammer mill 43, to provide a secondary grinding of the chips. The ground and pulverized wood will be conveyed to a roto-paddle blower 44, and delivered by conduit tubing 45, for emitting into the upper end of a cyclone wood chip hopper 46, as can be noted. Support structure, as at 47, provides the bracing necessary for structurally holding the system in place. From the cyclone wood chip hopper, the ground wood, which may include wood chips, wood dust, paper pulp, ground up cardboard, or any other of the pulp ingredients, are delivered to a variable speed rotary-air lock, as at 48. At this juncture, the proper amount of the wood ingredient is delivered to a vibrating classifier 59, where the dust and extra fines are removed and sent to the fine hopper, 50 by augar 51, as noted. At this point, into the pre-mixer 52, fly ash from an outside silo source 53 is delivered by way of a variable speed auger 54, to the pre-mixer. The fly ash may be generated and deposited into the silo from any coal fired power plant.

In addition to the delivery of the wood chip component, and the fly ash from external sources, water, by way of the positive displacement water pump, 53a, is also metered into the feed water line after the pump via the positive displacement additive pumps, 57 in an amount to provide it with the proper degree of texture that renders the mixture more pliable, and capable of being either molded, extruded, or compressed, as can be understood. The amount of the ingredients added, including the water, can be determined from the formulations as previously set forth.

From the pre-mixture, a variable speed mixer further mixes up the ingredients, as at 52, and delivers it to a variable speed extruder, molder, or hydraulic press, that moves the formulated material in continuous lengths, as can be seen by the block exiting from the extruder die, as at 58. At this juncture, the blocks may be cut to the desired lengths, which may be anywhere from inches, up to four feet through sixteen feet in length, as noted. At this point the cut blocks will then be conveyed upon the conveyor 56, to a location for drying, curing, storage, or even for use for installation at a building site.

Figure 2:
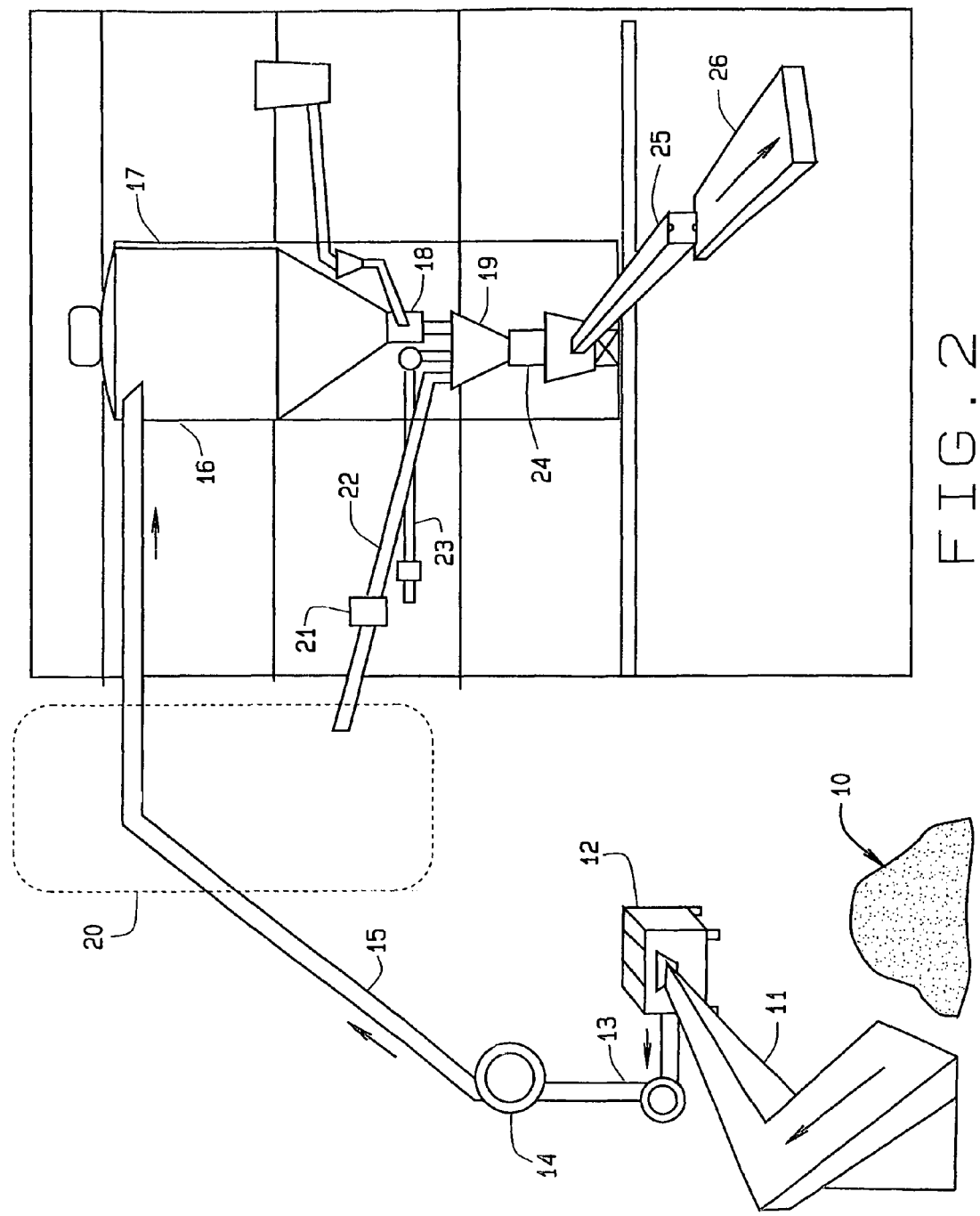
FIG. 2 is a schematic view of one system for processing the molding or compression, or extrusion, of the building blocks of this invention.

As an example of usage of the molding, compression, extruding process, utilizing the system. As can be seen from FIG. 2, the batch system for extruding the industrial building blocks of this invention is readily disclosed. As noted, the ingredients for the block are processed by the system, as disclosed. For example, pre-ground wood chips, as at 10, are delivered by conveyor 11, to a hammer mill 12, to provide a secondary grinding or pulverizing of the chips. The ground and pulverized wood will be conveyed by a blower 13, to a roto-paddle blower 14, and delivered by conduit tubing 15, for emitting into the upper end of a cyclone wood chip hopper 16, as can be noted. Support structure, as at 17, provides the bracing necessary for structurally holding the system in place. From the cyclone wood chip hopper, the ground pulp, which may include wood chips, wood dust, paper pulp, ground up cardboard, or any other of the pulp ingredients, are delivered to a variable speed roto-feeder, as at 18. At this juncture, the proper amount of the wood ingredient is delivered to a pre-mixer 19, as noted. At this point, and into the pre-mixer, fly ash from an outside silo source 20 is delivered by way of a positive displacement compressor 21, through a conduit 22, to the pre-mixer. The fly ash may be generated and deposited into the silo from any of the variety of sources for this type of ingredient. For example, it may be the fly ash from a cement plant. Or, it may be the fly ash generated from many of the other installations that generate class C fly ash In addition to the delivery of the wood chip component, and the fly ash from external sources, water, by way of the conduit 23, is also metered into the pre-mixer, in an amount to provide it with some degree of texture that renders the mixture more pliable, and capable of being either extruded, or compressed, as can be understood. The amount of the ingredients added, including the water, can be determined from the formulations as previously set forth.

From the pre-mixture, a variable speed mixer further mixes up the ingredients, as at 24, and delivers it to a variable speed extruder, that extrudes the formulated material in continuous lengths, as can be seen by the block exiting from the extruder dye, as at 25. At this juncture, the blocks may be cut to the desired lengths, which may be anywhere from inches, up to four feet through sixteen feet in length, as noted. At this point the cut blocks will then be conveyed upon the conveyor 26, to a location of drying, curing, storage, or even for use for installation at a building site.

The percentages of the ingredients for the block formulation when the sugar beet waste lime is applied may be determined from the following table.

In the formation of the blocks from the hydraulic or other pressure compressed blocks, the material will be formed similar in the manner as the pre-mix for the extruding, or molding process, including up to the delivery of the Class C fly ash and wood, etc, to the plant, for mixing, as previously explained. The material from the mixer, in the extruding process of FIG. 2, will be left dry, and bagged, for delivery to the feed hopper, of the Encore Building Solutions, Inc., St. Louis, Mo. Another extruding process for compressing blocks, at low pressure, into the building block form may be obtained from Encore Building Solutions, Inc., of St. Louis, Mo.

Generally, the same formula is used as in the extruding process, but in the high pressure press, other blends will also work because of the pressure involved, up to three thousand pounds (200-600 lbs.) per square inch, which is further effective in forming the desire block.

The pre-mix is added to a feed hopper, with a blender, built into it. A liquid pump delivers water by way of a twelve volt marine type pump. This makes the press totally self contained, portable, and with the hydraulic press being provided directly upon the trailer frame, when constructed. Once the hydraulic engine is turned on, the pre-mix is poured into the feed hopper, delivered to the blender; some moisture is added, generally in the range of enough water to make a substantially viscous pre-mix. The press is then applied, after a batch of the materials provided into the mold, at the compression chamber, for immediately forming a block. A spray system may be used for adding the treated water at the blender/mixer, and the water tank assembly holds approximately one hundred gallons of water. The compression chamber, at the mold, may include a weighing device, to ensure that the proper amount of materials is added into the mold, before compression is initiated. The mold may also be constructed in a manner to provide the shape the block is desired, as for example, the mold may contain the semi circular protrusions, in order to form the grooves 2 and 3, within the finished block, when compressed. Also, the tongue and groove arrangements, 5-8, can also be formed in a similar manner.

Figure 8:
FIG. 8 provides a schematic of one of the building blocks showing the various wood fibers within their identified dimension that are added to the block up to approximately 65% by weigh of the mix formulation.

FIG. 8 shows an example of one of the building blocks of this invention, and shown upon its surface the various wood fibers that are integrated into the structure of the pressure molded block of this invention. It should be recognized that these fibers may be added into the premix for the block up to an amount of about 65% by weight of the mix. The rough fibrous wood, or ground up wood, is initially passed over a 20 mesh screen thereby allowing the fines to fall through. This leaves fibers in the category of ⅛ inch to ¹¹⁄₁₆ of an inch in length remaining, with the majority being ³⁄₁₆ to ½ inch in length. Generally, these fibers have a diameter or width approximately ¹⁄₁₆ of an inch, or even less, and have found to be the ideal fibers to intermix with the class c fly ash, water, and any other ingredients added, in forming the premix for molding into the block form. These sized fibers are ideal and absolutely essential to the formation of the current building block. The strength of the block comes from the fly ash slurry, encapsulating these sized fibers into a homogenous blend, with thousands of such fibers being intermixed within the blend, before it is added as slurry into the mold, for being subjected to pressure and formed into the block form. Generally, these fibers, of this size, form the reinforcement rod like structure that hold the blocks together. No saw dust or bark material is added to the mix, since these are filtered out. Any ingredients that do not fit within these distinguishable fiber lengths, are not added to the slurry. These types of fibers, within the slurry, add to the strength of the molded block.

It has also been recognized that adding 3% to 5% of a ground dehydrated gypsum to the ad-mix, that the pot life of the slurry, or the flowability of the slurry was extended. This greatly helps the slurry flow through the block press, as the blocks are being prepared for formation. The dehydrate gypsum (uncalcined) is the raw gypsum found when the gypsum is initially mined. The only processing done to the raw gypsum is grinding it into a powder form. Other gypsum products, not of the dehydrate type, are not desirable for addition into the formation of the current blocks.

Another ingredient that is optionally mixed into the slurry is a plasticizer identified as AQUA PLUS, available from Acme-Hardesty Corporation, of Blue Bell, Pennsylvania, and this is added as a wetting agent and a surfactant solution to the composition. This is to assure that moisture is absorbed thoroughly by the class c fly ash, and wets the surface of the added fibers, to assure that the pozzolanic reaction encompasses all of these ingredients, to form a thoroughly integrated and molded block, when subjected to the pressures defined herein. The AQUA PLUS surfactant solution allows for the premix to absorb more water, to maintain the flowability of the pre mix as it is delivered to the molds, and prevents the clogging of the molding equipment during its prolonged usage.

Blocks formed in the manner as described exhibit very little shrinkage once formed and used in wall formation. Furthermore, when subjected to a freeze-thaw test, ASTM C-679 ASTM C-1262, very little breakage or shattering of the blocks have been experienced. It has been found that the blocks, when formed into a wall, provide enhanced retarding against sound transmission through the wall when employed. Thus, there is a noise reduction. Apparently the blocks have a tendency to absorb sound.

Variations or modifications to the subject matter of this invention may occur to those skilled in the art upon reviewing the disclosure as provided herein. Such variations, if within the spirit of this development, are intended to be encompassed within the scope of the invention as described herein. The description of the preferred embodiment, and as shown in the drawings and schematics, is set forth for illustrative purposes only.

The invention claimed is:

1. A building block capable of accepting and holding a wood screw or nail in usage, said block being uniformly fabricated from molding, extruding, or compressing the blocks into a high strength, medium weight building block, said block fabricated into a multi-sided integrated block, and being entirely molded from a formulation of ingredients which when the ingredients are mixed and, treated with water there occurs a pozzolanic reaction, the mixture of ingredients including:

class C fly ash containing calcium oxide and mixed with silica which in the presence of water initiates a pozzolanic reaction to form a calcium silicate hydrate combination;

ground cellulosic material or other aggregate material in the fibrous or solid state form selected from ground wood and wood chips, having a fibrous length of approximately ⅛ inch to ¹¹⁄₁₆ inch in length, and being approximately 1/16 inch in diameter or width, and mixed in the formulation between about ten percent (10%) to sixty-five percent (65%) by weight of the mixed formulation;

ground dehydrated gypsum added to the composition in an amount of between about 3% to 5% by weight of mixture;

a surfactant solution functioning as a wetting agent and maintaining flow-ability to the mixture when water is added to the mixture up to approximately 2% by weight of the formulation;

water added in the range of about ten percent (10%) to about twenty percent (20%) by weight of the mixed formulation;

adding to the composition one or more fire retardant, and an insecticide, to make the block mold resistant and resistant to deterioration by insects, said fire retardant comprising boron, added in the range of one-half percent (1/2%) to five percent (5%) by weight of the mixed formulation to furnish the fire retardancy and as a preventer of insect infestation to the molded block;

a plasticizer added to the ingredient mixture in a amount of about one-eighth percent (1/8%) to two percent (2%) by weight of the mixture; and whereby pressure in the range of about 200 psi to 600 psi is applied to said mixed ingredient formulation as the pozzolanic reaction commences to form the mixture into the block form.

2. The building block of claim 1 wherein said cellulostic material is selected from ground wood, textile fiber, ground bamboo, rice hulls, that are combined with either ground wood and/or chips, and having an amount of Portland cement added thereto, water is added to moisturize the composition, and then the composition is processed by one of extrusion or compression in a press to form the configured block.

3. The building block of claim 2 and including said building block having end walls, side walls, and a top and bottom wall, at least one of said end walls and at least one of said top and bottom wall having a tongue portion, and the other of said end wall, and the other of said top and bottom wall having a groove, to accommodate the insertion of another building block tongue therein during the erection of a wall.

4. The building block of claim 1 and wherein said fibrous ingredients are solid state fibers comprise wood chip fibers of the specified dimensions.

5. The building block of claim 4 and including as an additive AQUA PLUS to function as a wetting agent in the mix to assure a wetting of all the intermix ingredients in preparation for pressure forming of the building block.

6. The building block of claim 1 and including Portland cement, added in the range of ten percent (10%) to twenty percent (20%) by weight of the mixed formulation to furnish an increase pozzolanic reaction to the ingredients when forming the building block.

7. The building block of claim 1 wherein additional pressure may be applied to the mixed ingredient formulation up to approximately 3,000 psi.

* * * * *